United States Patent [19]

Kim

[11] Patent Number: 5,773,051
[45] Date of Patent: Jun. 30, 1998

[54] FISH FEED AND PROCESS FOR ITS MANUFACTURE

[76] Inventor: Sung-Tae Kim, 253-6, Nonhyun-dong, Kangnam-gu, Seoul, Rep. of Korea

[21] Appl. No.: 680,121

[22] Filed: Jul. 15, 1996

[30] Foreign Application Priority Data

Jul. 31, 1995 [KR] Rep. of Korea .................. 95-23568

[51] Int. Cl.[6] ................................. A23L 1/09; A23L 1/05
[52] U.S. Cl. .................................. 426/1; 426/2; 426/516; 426/517; 426/518; 426/623; 426/805
[58] Field of Search .................................. 426/1, 2, 805, 426/516, 517, 518, 623

[56] References Cited

U.S. PATENT DOCUMENTS

| | | | |
|---|---|---|---|
| 3,591,389 | 7/1971 | Schneider | 426/805 |
| 3,607,295 | 9/1971 | Morgan | 426/1 |
| 3,889,007 | 6/1975 | Gunter et al. | 426/805 |
| 4,746,528 | 5/1988 | Prest et al. | 426/805 |
| 5,171,588 | 12/1992 | Ishihara et al. | 426/1 |
| 5,653,973 | 8/1997 | Lew et al. | 426/1 |

*Primary Examiner*—Helen Pratt
*Attorney, Agent, or Firm*—Birch, Stewart, Kolasch & Birch, LLP

[57] ABSTRACT

A fish-breeding feed which refloats after initially sinking. The fish-breeding feed contains conventional feeds, glucose and other materials which enhance the overall quality of the feed.

13 Claims, No Drawings

FISH FEED AND PROCESS FOR ITS MANUFACTURE

BACKGROUND OF THE INVENTION

1. Field of the Invention

The present invention relates to a process for manufacturing a fish-breeding feed (hereinafter referred to as "feed") which refloats after initially sinking.

2. Description of Related Art

With the rising population there is the desire and need for breeding saltwater fish, fresh-water fish, and aquarium fish, and there is also the need to significantly improve the efficiency and convenience of fish-breeding feed. To cope with the demand, some feed-types such as sinking feed, floating feed, and a complex feed (where a part of the feed sinks and another part floats), have been developed. However, the floating feeds are unsuitable for fish living at the bottom of the water. In the case of sinking feeds, a part of the sinking feed is caught and lost between cracks in stones or in seaweed so that the fish cannot easily eat the foot. Such wasted feed is responsible for monetary loss and its decay contaminates the water, thus destroying the environment and threatening fish survival.

BRIEF DESCRIPTION OF THE INVENTION

To overcome the above problem, therefore, it is an object of the present invention to provide a fish-breeding feed which will refloat after sinking, and which has the advantage that the supplied feed will gradually refloat after originally sinking to the bottom, thereby providing a good opportunity for the fish to feed regardless of their living territory. Thus, the fish feeding efficiency is maximized, thereby making it easier to eliminate water contamination associated with an excess supply of feed and an accumulation of feed at the bottom of the water.

In order to accomplish the aforementioned objections, the present invention is characterized by a process for manufacturing a fish-breeding feed which will refloat after sinking, which comprises: blending conventional fish-breeding feeds containing fish meal, wheat meal, and soybean meal with a refloating material which causes the feed to refloat when contacted with water, e.g., glucose, xanthan gum, sodium caseinate, sodium metaphosphate, and soybean lecithin. According to the present invention, the mixture is supplied in powder form to a mixer where it is homogeneously mixed. The homogeneous mixture is then passed through the compressed screw of an extruder, while supplying water in an amount of 15% to 25% by weight, followed by high-speed mixing for 10 to 20 sec. The mixture is then transferred to the compressed screw of the extruder whereby it is compressed at a constant temperature of 80° C. to 100° C. within a die to produce successive molded products. The continuously compressed molded products are cut in appropriate sizes to form suitable feeds. The fish-breeding feed of the present invention, based on this manufacturing process, has the following characteristics: small spaces are formed within the inner parts of the feed. That is, when the heated molded material is pushed at high pressure through a die, its structure is caused to swell and small crevices are formed within the material. When the feed is added to water, bubbles are generated over time within the inner space created by the crevices and at the surface of the feed due. Due to the buoyancy created by the presence of oxygen, the feed, which initially sinks, rises to the surface and floats on the water. The floating state of the feed may be maintained for several hours, without destruction.

DETAILED DESCRIPTION OF THE INVENTION

The process of manufacturing fish feed in accordance with the preferred embodiment of the present invention will be better understood from the following detailed description.

According to the present invention, well known fish-breeding feeds containing fish meal and wheat meal are blended with a number of substances which contribute to the refloating of the feed. Glucose is added as an active ingredient to cause the generation of bubbles when the feed is contacted with water, thereby causing the feed to rise. Xanthan gum and sodium caseinate is added to improve the viscosity (stickiness) and to supplement the generation of bubble formation. Sodium tripolyphosphate is added to enhance the hardness and compact feed structure and provide elasticity after the feed has absorbed the water. Soybean lecithin is utilized as an emulsifier to enhance the affinity between sodium metaphosphate and the oil/water mixture. The mixture, in powder form, is supplied to a mixer for homogeneous mixing. Then, the homogeneous mixture is passed through an extruder, while supplying water in an amount of 15% to 25% by weight, based on the total mixture, followed by high-speed mixing for 10 to 20 sec. Thereafter, the mixture is added to a screw conveyor where it is compressed at a constant temperature of 80° C. to 100° C. When the floating feeds are manufactured, the temperature should be maintained at 100° C. to 130° C., and passed through a die to produce molded articles in cylindrical or spherical form which is cut by a high-speed knife into particles having dimensions ranging from 1–10 mm in diameter, 0.5 mm in thickness, and 15 mm in length.

Fish food having a thin layer plate configuration (i.e., flake-type feed) may be produced by compressing the continuously-compressed molded articles through a die and by utilizing a pressurized roller rather than a high-speed knife.

It should be noted that the reason why a small amount of water should be supplied to the premixture with a short mixing time is to prevent a reduction in the floating function after the feed initially sinks. When the mixture is contacted with water, the substances tend to generate bubbles. The bubbles generated from the process of mixing the substances with water cause a release of pre-bubbles which may adversely effect the formation of complete bubbles for the feed.

It should also be noted that the reason why the compression temperature is maintained at 80° C. to 100° C. is to prevent the caramelization of glucose and losses of nutrients, together with the avoidance of any strong tendency to float. In the event that the compression process of the feed is conducted at more than 100° C., the feed cannot be caused to initially sink and on the contrary, the tendency to float becomes stronger.

When the feed of the present invention is added to water, water is absorbed by the feed and small bubbles are produced due to the complex action of floating materials added to the well known feeds. Since the additives have various functions, e.g., glucose is added to generate bubbles and xanthan gum, sodium caseinate, etc. are added to provide the desired viscosity and flexibility, their combined effect tends to protect the bubbles generated in the water. Further, with the balance between hydrophobic and hydrophilic elements, the film membrane of the generated bubbles, being flexible with water, is formed at the surface of the feed. Although bubbles are generated within the small spaces of the feed, the viscosity and flexibility of the feed prevents the bubbles from escaping and, in fact, extends their size as the bubbles become larger. In this manner, the feed of the present invention is refloated after initially sinking and when it is refloated, the feed is not easily decomposed.

As described above, when the feed of the present invention is contacted with water, it sinks at an initial stage and is refloated due to enhanced buoyancy caused by the generation of small bubbles within the feed and at the surface of the feed. After the feed initially sinks, a small amount of the feed is gradually refloated after about 30 sec to 1 min. With the lapse of about 50 min, the refloating is generally completed and thereafter, the feed will remain in a floating state for another two or three hours, based on the flexible/ blending ratio of the substances. Thus, the floating time may be extended or shortened by changing these parameters. Unlike other conventional floating or sinking feeds that completely sink after the bubbles dissipate, the feed of the present invention is more available for fish to eat.

Further, according to the present invention, the use of glucose containing polysaccharides manufactured by the already-known microorganism-fermentation or enzyme-decomposition methods are effective in providing second and third nutrients produced by fermentation.

The composition of a typical fish-breeding feed is as follows:

1) Well Known Substances Utilized to Produce a Fish Feed Blend 75.2–94% of the following well known substances: fish meal, soybean meal, wheat meal, starch, wheat bran, corn powder, seed-gathering gourd, meal powder, wheat embryo bud, dried oil grease, and corn gluten.

2) Enhancers 0.5–1.0% of trace inorganic substances and vitamins

3) Substances Enabling the Feeds to be Refloated After Sinking

5–20% of glucose 0.1–1.0% of xanthan gum 0.1–0.7% of sodium caseinate 0.1–0.5% of sodium tripolyphosphate 0.1–0.6% of sodium metaphosphate 0.1–1.0% of soybean lecithin The amounts of the above substances are in percent by weight.

The following examples are illustrative of the preferred embodiments only and are meant in no way to limit the scope of the invention.

EXAMPLE 1

A mixture having the following blending ratio was mixed under high-speed mixing. While maintaining the temperature at 90° C., the mixture was compressed by an extruder, and then immediately after passing through a die, the kneaded material was cut to manufacture a feed in spherical form having a diameter of 4–5 mm.

| Mixing ratio of fish-breeding feeds in Example 1 of the invention | |
|---|---|
| Item | Weight % |
| Wheat meal | 20% |
| Fish meal | 35% |
| Soybean meal | 16% |
| Wheat bran | 8% |
| Meat powder | 6% |
| Corn gluten | 3% |
| Wheat embryo | 3% |
| Vitamins, minerals | 0.4% |
| Glucose | 6.7 |
| Xanthan gum | 0.3% |
| Sodium caseinate | 0.7% |
| Sodium metaphosphate | 0.4% |
| Sodium tripolyphosphate | 0.2% |
| Soybean lecithin | 0.5% |

Table 1 shows the floating characteristics of said feeds after sinking. Table 2 shows the growth of carp after 30 days comparing the feed of the present invention with conventional feeds.

TABLE 1

| Beginning time of floating after initially sinking | Retention time After Floating |
|---|---|
| Gradual floating in small amounts after 30 sec. | 2.75 hrs |

Note: The results in Table 1 were observed in a beaker containing tap water at 22° C.

TABLE 2

| Feed | Initial mean weight (g) | Mean Weight after 30 days (g) | Growth (%) |
|---|---|---|---|
| Invention | 225.0 | 337.3 | 149.9 |
| Comparison (sinking feed) | 225.0 | 283.4 | 125.9 |

As noted in the above Table 2, the growth rate of carp based on the feed of the present invention was higher than that of conventional feed, which may be understood from the following reasons: When the same amounts of different feed were supplied, and the feed was gradually refloated after initially sinking, the carp were provided with sufficient opportunity and time to feed, regardless of their location, compared with sinking or floating feeds.

In a continually refloating state rather than a standstill state, the refloating feed draws the interest of the carp, prompting them to eat more vigorously.

EXAMPLE 2

The mixing ratio of the fish-breeding feed in Example 2 is the same as that of Example 1, except for the following: Instead of pure glucose, polysaccharides in an amount of 12% by weight (containing more than 50% of glucose by enzyme hydrolysis) based on microorganism-fermentation and enzyme-decomposition methods was dried, while decreasing the content of wheat bran by 2%. The feed was manufactured as in Example 1, and the refloatability and fish growth were observed using these feeds with similar results as in Example 1 being obtained.

As described above, the fish-breeding feed, which is refloated after sinking, may be prepared by blending conventional feeds with substances which generate bubbles when contacted with water. The feed so formed have the following advantages:

When the feed is refloated after initially sinking in the water, the fish are provided with a sufficient opportunity to feed which facilitates fish-breeding. Also, since an excess of feed is not required, deterioration of water quality due to pollution may be prevented. In addition, the proper concomitant use of floating feeds (feeds in the floating state all the time) and sinking feeds which refloat may result in significant breeding advantages.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for manufacturing a fish-breeding feed which will refloat after initially sinking, which comprises blending conventional fish-breeding feed containing fish meal, wheat meal, and soybean meal with substances which cause the feed to refloat when contacted with water, said substances including glucose, xanthan gum, sodium caseinate, sodium metaphosphate, sodium triphosphate, and soybean lecithin;

supplying this blended mixture in powder form to a mixer for homogeneous mixing;

passing the homogeneous mixture through the compression screw of an extruder, while supplying 15% to 25% by weight of water, followed by high-speed mixing for 10 to 20 sec;

transferring the mixture to the compression screw of the extruder and compressing it through a die at a constant temperature of 80° to 100° C. to produce successive molded products; and cutting the molded products in appropriate sizes suitable for fish feed.

2. The process as recited in claim 1, wherein said glucose includes polysaccharides containing glucose manufactured based on microorganism-fermentative or enzyme-decomposition methods.

3. The process as recited in claim 1, wherein the composition ratio of substance enabling the feeds to be refloated after sinking comprises 5–20% of glucose, 0.1–1.0% of xanthan gum, 0.1–0.7% of sodium caseinate, 0.1–0.5% of sodium tripolyphosphate, 0.1–0.6% of sodium metaphosphate and 0.1–1.0% of soybean lecithin.

4. The process as recited in claim 1, wherein the compressed molded products are formed into flakes by compressing them with pressurized rollers.

5. The process as recited in claim 1, wherein the conventional fish-breeding feed is present in an amount of 75.2 to 94% by weight.

6. A process for manufacturing a fish-breeding feed which will refloat after initially sinking which comprises:

blending a conventional fish-breeding feed containing fish meal, wheat meal and soybean meal with substances which cause the feed to refloat when contacted with water, said substances including glucose, xanthan gum, sodium caseinate, sodium metaphosphate, sodium triphosphate, and soybean lecithin, in the presence of 15 to 25% by weight water to form a homogeneous mixture, and compressing the mixture at a constant temperature of 80° to 100° C. to produce a molded product.

7. The process of claim 6 wherein the blending step is facilitated by high-speed mixing for 10 to 20 seconds.

8. A fish-breeding feed composition which refloats after initially sinking, which comprises:

a fish feed, and substances which cause the fish feed to refloat when contacted with water, said substances including glucose, xanthan gum, sodium caseinate, sodium methaphosphate, sodium triphosphate, and soybean lecithin.

9. The fish-feeding feed composition of claim 8, further containing polysaccharides.

10. The fish-breeding feed composition of claim 9, wherein the polysaccharides containing glucose are present in an amount of 12% by weight.

11. The fish-breeding feed composition of claim 8, wherein the fish feed includes fish meal, wheat meal, and soybean meal.

12. The fish-breeding feed composition of claim 8, wherein 0.5 to 1.0% of trace inorganic substances and vitamins are further added to the composition.

13. A fish-breeding feed which refloats after initially sinking, which comprises 75.2 to 94% by weight of a fish feed, 0.5 to 1.0% by weight of trace inorganic substances and vitamins, 5 to 20% by weight of glucose, 0.1 to 1.0% by weight of xanthan gum, 0.1 to 0.7% by weight of sodium caseinate, 0.1 to 0.5% by weight of sodium tripolyphosphate, 0.1 to 0.6% by weight of sodium metaphosphate, and 0.1 to 1.0% by weight of soybean lecithin.

* * * * *